United States Patent
Aggarwal et al.

(10) Patent No.: US 9,001,920 B2
(45) Date of Patent: Apr. 7, 2015

(54) APPARATUS AND METHOD FOR INTERFERENCE CANCELLATION IN COMMUNICATION SYSTEMS

(71) Applicant: AT&T Intellectual Property I, LP, Atlanta, GA (US)

(72) Inventors: Vaneet Aggarwal, Parsippany, NJ (US); Dinesh Bharadia, Stanford, CA (US); Rittwik Jana, Parsippany, NJ (US); Christopher W. Rice, Morris, NJ (US); Nemmara K. Shankaranarayanan, Bridgewater, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 30 days.

(21) Appl. No.: 13/770,739

(22) Filed: Feb. 19, 2013

(65) Prior Publication Data
US 2014/0233669 A1    Aug. 21, 2014

(51) Int. Cl.
*H04B 15/00* (2006.01)
*H04L 25/03* (2006.01)

(52) U.S. Cl.
CPC ...................................... *H04L 25/03* (2013.01)

(58) Field of Classification Search
USPC ......... 375/285, 340, 346, 348, 350; 455/63.1, 455/114.2, 552.1, 307
See application file for complete search history.

(56) References Cited

U.S. PATENT DOCUMENTS

| | | | | |
|---|---|---|---|---|
| 5,982,327 A * | 11/1999 | Vook et al. | | 342/380 |
| 7,302,009 B2 * | 11/2007 | Walton et al. | | 375/267 |
| 7,949,366 B2 * | 5/2011 | Rofougaran | | 455/552.1 |
| 8,259,879 B2 * | 9/2012 | Berens et al. | | 375/346 |
| 8,335,286 B2 * | 12/2012 | Mergen et al. | | 375/350 |
| 8,385,484 B2 * | 2/2013 | Nie et al. | | 375/346 |
| 8,391,429 B2 * | 3/2013 | Mergen et al. | | 375/350 |
| 8,565,708 B2 * | 10/2013 | Sornin | | 455/307 |
| 8,634,332 B2 * | 1/2014 | Tang et al. | | 370/277 |
| 2010/0177857 A1 | 7/2010 | Huttunen et al. | | |
| 2012/0257690 A1 | 10/2012 | Li | | |

OTHER PUBLICATIONS

Hua, Yingbo, "A Method for Broadband Full-Duplex MIMO Radio", IEEE Signal Processing, vol. 19, No. 12, Dec. 2012, 793-796.

\* cited by examiner

*Primary Examiner* — Khanh C Tran
(74) *Attorney, Agent, or Firm* — Guntin & Gust, PLC; Joseph P. Hrutka

(57) ABSTRACT

A system that incorporates the subject disclosure may include, for example, determining channel gains for a group of transmitters based on transmitted training symbols; and performing analog time domain cancellation and digital time domain cancellation responsive to a determination that a total interference does not satisfy a threshold range of the analog-to-digital converter, where the total interference is determined based on the channel gains. Other embodiments are disclosed.

20 Claims, 4 Drawing Sheets

100

APPARATUS AND METHOD FOR INTERFERENCE CANCELLATION IN COMMUNICATION SYSTEMS

FIELD OF THE DISCLOSURE

The subject disclosure relates to an apparatus and method for interference cancellation in communication systems.

BACKGROUND

Wireless communications often experience interference from various sources, where the interference may be self-interference, remote interference or a combination of the two. The interference can degrade the quality of service and can be exacerbated in areas where there is a high volume of wireless communications.

BRIEF DESCRIPTION OF THE DRAWINGS

Reference will now be made to the accompanying drawings, which are not necessarily drawn to scale, and wherein.

DETAILED DESCRIPTION

Figure 1:
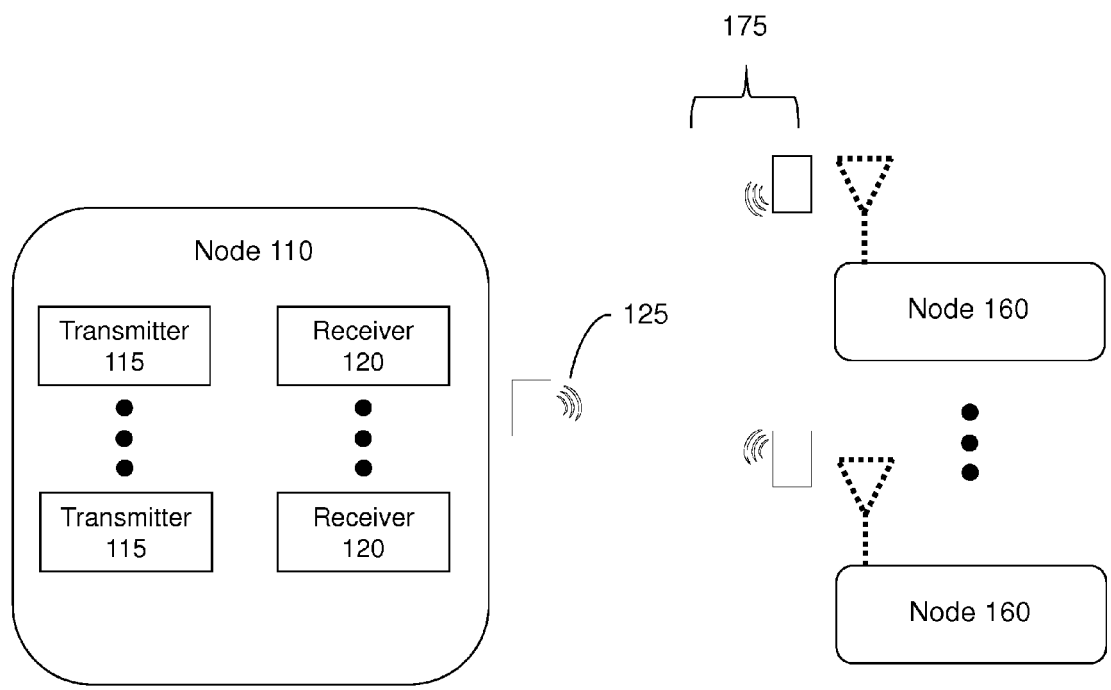
FIG. 1 depicts an illustrative embodiment of a communication system that provides communications services which include interference cancellation.

The subject disclosure describes, among other things, illustrative embodiments in which analog and/or digital cancellation are selectively applied at a receiving device based on a number of factors, which can include a dynamic range of an analog-to-digital converter (ADC) of the receiving device. The cancellation can be for self-cancellation and/or for remote cancellation. In one embodiment, the cancellation can be performed in the time domain.

In one or more embodiments, cancellation can be performed by a receiving device via estimating a channel gain from each interferer to the receiver in the time domain, and convolving with the transmitted data in time domain to cancel the interference at the receiver. In one embodiment, this time domain approach can remove the interference from both the data part as well as the cyclic prefix part in an orthogonal frequency division multiplexing (OFDM) symbol which frequency based cancellation signal will fail to do.

Other embodiments are included in the subject disclosure.

One embodiment of the subject disclosure is a method including receiving, by a system including a processor, a group of signals from a group of transmitters, where each of the group of signals includes training symbols according to an orthogonal frequency-division multiplexing protocol. The method includes determining, by the system, a channel gain for each of the group of signals, and determining, by the system, a total interference based on the channel gain. The method includes determining, by the system, whether the total interference satisfies a threshold range of an analog-to-digital converter of the system, and performing, by the system, digital time domain cancellation without performing analog time domain cancellation responsive to a determination that the total interference satisfies the threshold range. The method includes performing, by the system, the analog time domain cancellation and the digital time domain cancellation responsive to a determination that the total interference does not satisfy the threshold range.

One embodiment of the subject disclosure is a device including a memory to store computer instructions, an analog-to-digital converter, and a processor coupled with the memory and the analog-to-digital converter. The processor, responsive to executing the computer instructions, performs operations including determining channel gains for a group of transmitters based on training symbols associated with the group of transmitters. The processor selectively performs analog time domain cancellation and digital time domain cancellation responsive to a determination that a total interference does not satisfy a threshold range of the analog-to-digital converter, wherein the total interference is determined based on the channel gains.

One embodiment of the subject disclosure is a computer-readable storage device comprising computer instructions, which, responsive to being executed by a processor, cause the processor to perform operations comprising determining channel gains for a group of transmitters based on transmitted training symbols. The operations can include performing analog time domain cancellation and digital time domain cancellation responsive to a determination that a total interference does not satisfy a threshold range of the analog-to-digital converter, wherein the total interference is determined based on the channel gains.

Referring to FIG. 1, a communication system 100 is illustrated that includes various nodes of communication, such as node 110 and nodes 160. The nodes can represent various devices and/or combinations of devices, such as wireless end user devices, cellular/WiFi access point devices, base stations, femtocells, antennas, receivers, transmitters, and so forth. Node 110 can include various components such as one or more transmitters 115 and one or more receivers 120. Node 110 can transmit signals 125 and/or can receive signals 175, such as transmitted from one or more nodes 160.

System 100 is representative of various configurations of devices. For example, in one embodiment, system 100 can include a full duplex node configuration or use case where a node (e.g., node 110) transmits and receives at the same time in the same frequency. In this configuration, a self-signal can be cancelled at the receiver 120. Channel estimate can be formed from the transmitter to the receiver. In one embodiment, a channel estimate can then be found in a time domain h(n). The cancellation signal thus formed would be h(n) convolved with a test signal, as will be described later.

In another exemplary configuration, system 100 can represent a distributed full duplex multiple-input and multiple-output (MIMO) configuration or use case where each node is comprised of multiple antenna locations which are centrally backhauled. Since these locations can also be potential receive locations for full-duplex, the cancellation from self and remote locations can be performed to obtain a full-duplex distributed MIMO framework. In one embodiment, all channel estimates for the transmissions that are to be cancelled at a node are formed and the h(n) convolution with test signals for all the transmissions is the canceller signal at each node as will be described later.

In another exemplary configuration, system 100 can represent a remote jammer configuration or use case. In this configuration, a jammer can be used to jam the receive signals at the remote nodes. The jamming signal can be provided in digital to the authorized recipients. The recipient can then cancel this signal at their receiver.

In another exemplary configuration, system 100 can represent a remote access point cancellation for full duplex configuration or use case. In this configuration, access point(s) for cellular/WiFi are centrally managed. The signal from one access point can then be cancelled at another access point since the cancellation stream can be provided through the central backhaul.

In another exemplary configuration, system 100 can represent a cognitive radio configuration or use case where a signal from a primary transmitter can be cancelled by a secondary transmitter with available data of the primary transmitter.

In another exemplary configuration, system 100 can represent a successive interference cancellation configuration or use case. In this configuration, a decoding approach at the receivers is utilized where multiple signals are decoded by peeling them off one by one. For the peeling off, time domain based cancellation can be used to cancel the signal. This will also remove the residual interference of cyclic prefixes left by a frequency domain based cancellation.

In one embodiment, system 100 provides for self and remote cancellation. For example, remote cancellation can be implemented to cancel at a node from itself and the remote nodes. However, cancellation of a signal generated from multiple nodes can also be implemented, such as where a digital baseband signal is available for all the nodes involved in the cancellation. As an example, system 100 can include a combination of passive suppression, analog and digital cancellation. System 100 enables taking into account that signals received at the receiver after the analog cancellation from both the self-cancellation and the remote-cancellation can be at similar levels which implies that less analog cancellation may be needed for the remote node than is needed for self-node due to more passive suppression for the remote node. In some embodiments no analog cancellation for the remote node may be implemented as a result. Passive suppression is the reduced signal power received as a result of the path loss from the transmitter to the receiver antenna. Analog Cancellation removes the self-interference before the received signal hits an analog-to-digital converter (ADC) at the receiver. This cancellation can be performed using multiple approaches, such as estimation and cancellation using radio chains, balun based cancellation, and so forth. Various components and techniques can be employed including generating an out of phase signal to be combined with a signal delay for cancellation, such as utilizing phase shifters, attenuators, balun (Rf coupler), combiner, and so forth. The exemplary embodiments can also selectively employ digital time domain cancellation which is a cancellation technique that cancels the residual interference in the digital domain.

In one embodiment, the use of analog cancellation for a self-signal can be employed using various forms of analog cancellation such as estimation and cancellation, balun-based cancellation etc. Further, the remote node cancellation can involve digital cancellation and some analog cancellation (if needed). This is because after the passive suppression from the remote node, the residual interference may almost be at par with the signal from the self-node after analog cancellation. In another embodiment, two cancellations can be combined into a single cancellation such as a MIMO-based cancellation to estimate the channel gains for all the signals to be cancelled, and use a single canceller for all the signals.

In another embodiment, system 100 enables a time domain interference cancellation for OFDM communications. For example, cancellation may be employed in analog domain (RF, before ADC) and/or in digital domain (after ADC), as well as from itself and/or from another node(s). At the receiver in OFDM systems, estimation in frequency domain can be made and the signal is decoded with this estimation. However, if an estimate of the interference is found in the frequency domain, the cancellation in cyclic prefixes will not be precise and thus a time-domain based cancellation may be needed. Due to cyclic prefixes, frequency domain interference filtering in OFDM communications may be less effective. In one embodiment, this can be addressed by sending training symbols that allow the receiver to estimate channel gain, which is used to calculate total interference, and which is used to select either digital time domain cancellation only, or a combination of digital and analog time domain cancellation to be performed at the receiver.

In one embodiment, cancellation can be performed for signals (e.g., signals 125 and/or 175) from multiple transmit antennas (interferers such as nodes 160) at a receive antenna of node 110. This can be thought of multiple transmit antennas on the same or different devices. Each transmit antenna (e.g., of nodes 160) can send a training symbol (e.g., within signals 175) based on which the receiver node 110 estimates the time domain channel gain $h_i(n)$ for all the transmitters of nodes 160 indexed by i. If each transmitter i sends signal $x_i(n)$ in time domain, the interference received or channel gain is $\Sigma_i h_i(n)*x_i(n)$. This signal can be cancelled by the receiver node 110. This cancellation can be in analog and/or digital domain depending on the application. If the interference is much larger in power than the desired signals, analog cancellation may be preferable due to the dynamic range of the ADC of node 110. Some of the signals may be cancelled in the analog domain (before the ADC) while others cancelled in the digital domain.

The cancellation performed at node 110 enables or otherwise facilitates various communication services, including voice, video and/or data services such as to wireless devices including end user mobile devices represented by node 110 and/or 160. System 100 can enable communication services over a number of different networks, such as between an end user device and another communication device. The end user device can be a number of different types of devices that are capable of voice, video and/or data communications, including a mobile device (e.g., a smartphone), a personal computer, a set top box, and so forth. System 100 can be implemented via various networks and protocols including one or more of Universal Terrestrial Radio Access Network (UTRAN), Global System for Mobile communications (GSM) Enhanced Data rates for GSM Evolution (EDGE) Radio Access Network (GERAN), and E-UTRAN. The system 100 can further include one or more of a Serving General packet radio service (GPRS) Support Node (SGSN), a Mobility Management Entity (MME) and Mobile Switching Center (MSC).

In one or more embodiments, system 100 can provide for circuit switching fallback for packet switching so as to enable the provisioning of voice and other circuit switching-domain services (e.g., circuit switching UDI video/LCS/USSD) by reuse of circuit switching infrastructure, such as when an end-user device is served by the E-UTRAN. In one or more embodiments, a circuit-switching fallback enabled terminal (e.g., node 110) connected to the E-UTRAN may use the GERAN or UTRAN to connect to the circuit switching-domain. In one or more embodiments, the circuit switching fallback and Internet protocol Multimedia Subsystem (IMS)-based services of system can co-exist in a single service operator's network.

In one or more embodiments, the E-UTRAN can be the air interface for the Long Term Evolution (LTE) upgrade path for mobile networks according to a $3^{rd}$ Generation Partnership Project (3GPP) specification. The E-UTRAN can include enodeBs on the network that are connected to each other such as via an X2 interface, which are connectable to the packet switch core network via an S1 interface. For example, the E-UTRAN can use various communication techniques including OFDM, MIMO antenna technology depending on the capabilities of the terminal, and/or beamforming for downlink to support more users, higher data rates and lower processing power required on each handset.

The access devices described herein can operate according to various wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the communication devices (including nodes 110 and/or 160).

Figure 2:
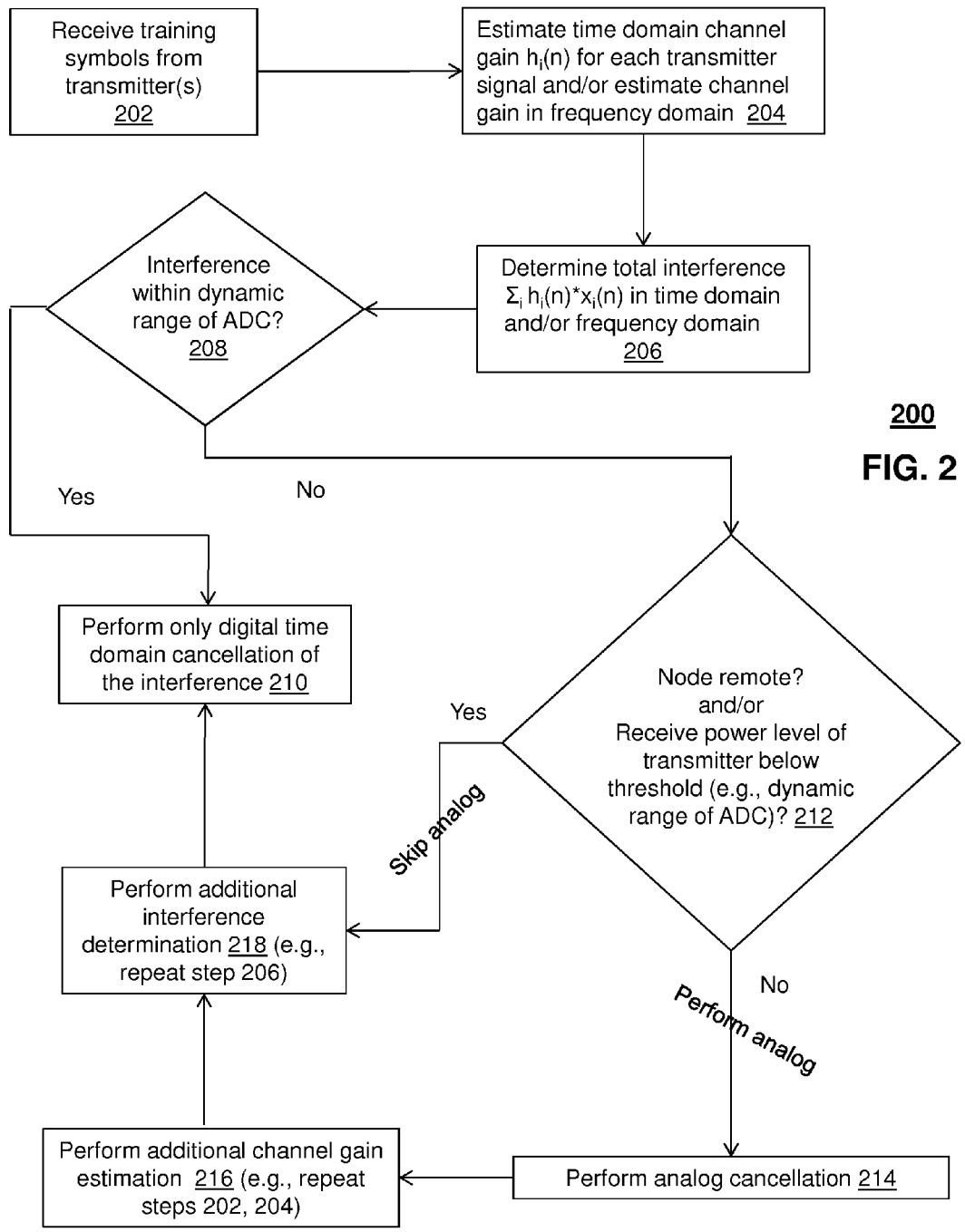
FIG. 2 depicts an illustrative embodiment of a method used in portions of the system described in FIG. 1.

FIG. 2 illustrates a method 200 for providing communication services. Method 200 is described with respect to nodes 110 and 160 of FIG. 1 but can be performed by various devices in various system configurations. Method 200 provides for cancellation at a receiver by selectively applying digital and analog cancellation. The selective application of the cancellation at the receiver can be based on various criteria, including use cases (e.g., self-cancellation and remote cancellation) and types of nodes.

Method 200 can begin at 202 in which the node 110 receives training symbols from one or more transmitters, such as transmitters of nodes 160. The training symbols can be associated with OFDM communications. In one embodiment, the training symbols are received as a broadcast pilot signal, although the present exemplary embodiments can provide training symbols in other ways, such as transmitting training symbols in response to a request, such as where an error detection in the network has occurred. Training symbols can be received from a group of transmitters, such as nodes 160 and can enable estimating channel gain at 204. The estimation can be performed at the node 110. In one embodiment, the estimation can be an estimation by the node 100 of the time domain channel gain $h_i(n)$ for each transmitter signal based on the received training symbols. In another embodiment, the estimation can be performed by the node 110 in the frequency domain.

At 206, a total interference $\Sigma_i h_i(n)*x_i(n)$ can be determined by the node 110. In one embodiment, the total interference can be determined in the time domain where $Xi(n)$ is the time domain signal. In another embodiment, the total interference can be determined in the frequency domain where $x_i(n)$ is the transmitter signal. At 208, a determination can be made as to whether the interference satisfies a desired threshold. For example, it can be determined whether the total combined interference is within a dynamic range of the ADC of the node 110. If the interference is within the dynamic range of the ADC or otherwise satisfies a desired threshold then digital time domain cancellation (without any analog cancellation) can be performed by the node 110 at 210. If on the other hand, the interference is not within the dynamic range of the ADC or otherwise does not satisfy the desired threshold then method 200 can proceed to 212 to determine whether analog cancellation is to be performed by the node 110. At 212, if the node contributing to the need for cancellation is a remote node and/or if the receive power level of the transmitter is below a threshold (e.g., the dynamic range of the ADC) then method 200 can proceed to 218 where an additional interference determination can be made, such as repeating step 206. Digital time domain cancellation can be performed by the node 110 without performing the analog cancellation in this case.

If on the other hand, the node contributing to the need for cancellation is not a remote node and/or the receive power level of the transmitter is not below the threshold (e.g., the dynamic range of the ADC) then method 200 can proceed to 214 where the analog cancellation is performed. At 216, additional channel gain estimation can be performed by the node 110 (e.g., repeating steps 202, 204) and method 200 can then proceed to the performance of the digital time domain cancellation.

In one or more embodiments, step 202 can enable identification of nodes transmitting signals so that a determination can be made as to whether to perform or skip analog cancellation, such as based on an identification of the node type including identifying remote nodes and use cases. In another embodiment, provisioned information including node identification can be obtained or otherwise accessed by the node 110 for the determination as to whether analog cancellation is warranted or desired.

In one or more embodiments, separate sets of training symbols (e.g., for analog cancellation and for digital cancellation) can be provided by each of the nodes 160. For instance, the node 110 could utilize a previously received training symbol from a remote node if an updated training symbol is not timely received. In one embodiment, training symbols for the analog cancellation can be transmitted by nodes 160 more frequently than training symbols for the digital cancellation.

In one or more embodiment, the application of the digital and/or analog cancellation can be performed by node 110 at various times, such as at the same frequency with which the pilot signals are being received, every other pilot signal, periodically, non-periodically, and so forth. In one or more embodiments, the analog cancellation can be a balun-based cancellation technique and/or the node 110 can perform cancellation utilizing radio chains.

Figure 3:
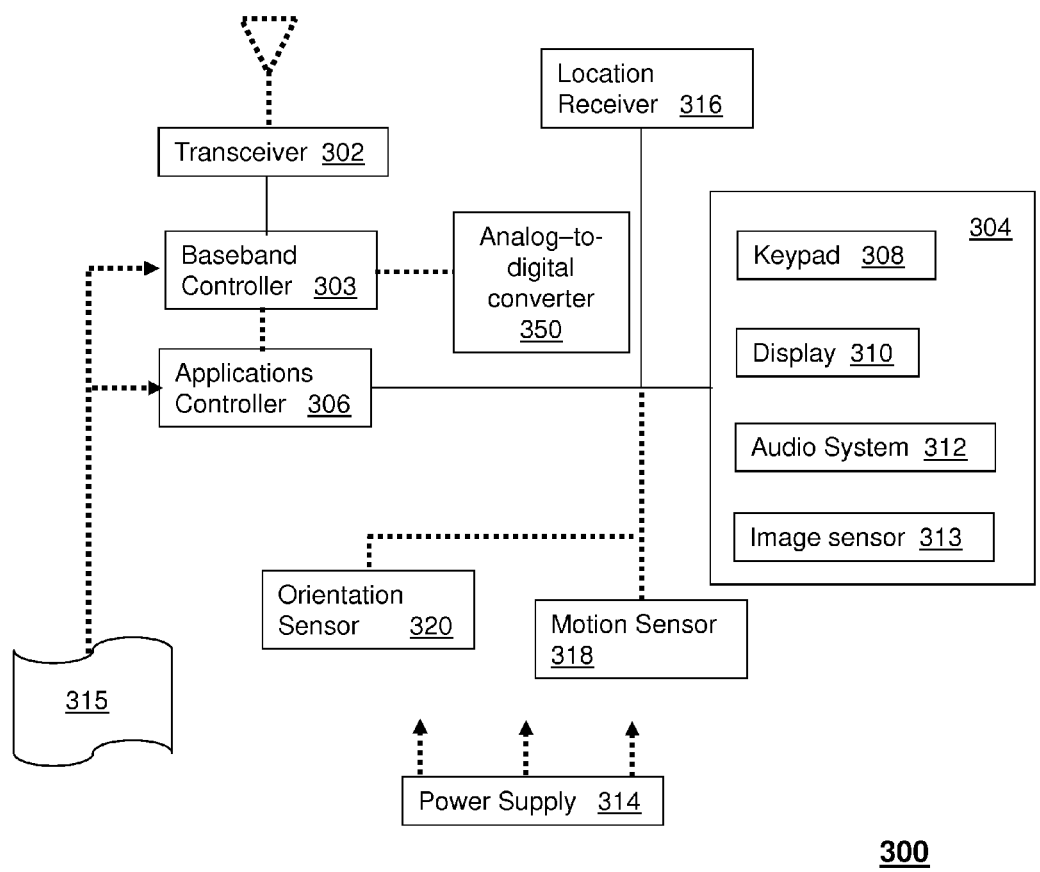
FIG. 3 depicts an illustrative embodiment of a communication device operable in the system of FIG. 1.

FIG. 3 depicts an illustrative embodiment of a communication device 300. Communication device 300 can serve in whole or in part as an illustrative embodiment of the devices depicted in FIG. 1. Device 300 can enable selective application of analog and/or digital cancellation for self-cancellation and/or remote cancellation. The application of the analog cancellation can be based on a number of factors including one or more of the total interference falling with the dynamic range of the ADC 350, the node being a remote node, and the receive power level being below a threshold.

To enable these features, communication device 300 can comprise a wireline and/or wireless transceiver 302 (herein transceiver 302), a user interface (UI) 304, a power supply 314, a location receiver 316, a motion sensor 318, an orientation sensor 320, and a controller 306 for managing operations thereof. The transceiver 302 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 302 can also be adapted to support circuit-switched wireline access technologies (such as PSTN), packet-switched wireline access technologies (such as TCP/IP, VoIP, etc.), and combinations thereof.

The UI 304 can include a depressible or touch-sensitive keypad 308 with a navigation mechanism such as a roller ball, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric keypad commonly used by phones, and/or a QWERTY keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310 with navigation features.

The display 310 can use touch screen technology to also serve as a user interface for detecting user input. As a touch screen display, the communication device 300 can be adapted to present a user interface with graphical user interface (GUI) elements that can be selected by a user with a touch of a finger. The touch screen display 310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 310 can be an integral part of the housing assembly of the communication device 300 or an independent device communicatively coupled thereto by a tethered wireline interface (such as a cable) or a wireless interface.

The UI 304 can also include an audio system 312 that utilizes audio technology for conveying low volume audio (such as audio heard in proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and/or charging system technologies for supplying energy to the components of the communication device 300 to facilitate long-range or short-range portable applications. Alternatively, or in combination, the charging system can utilize external power sources such as DC power supplied over a physical interface such as a USB port or other suitable tethering technologies.

The location receiver 316 can utilize location technology such as a global positioning system (GPS) receiver capable of assisted GPS for identifying a location of the communication device 300 based on signals generated by a constellation of GPS satellites, which can be used for facilitating location services such as navigation. The motion sensor 318 can utilize motion sensing technology such as an accelerometer, a gyroscope, or other suitable motion sensing technology to detect motion of the communication device 300 in three-dimensional space. The orientation sensor 320 can utilize orientation sensing technology such as a magnetometer to detect the orientation of the communication device 300 (north, south, west, and east, as well as combined orientations in degrees, minutes, or other suitable orientation metrics).

The communication device 300 can use the transceiver 302 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 306 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 300.

Other components not shown in FIG. 3 can be used in one or more embodiments of the subject disclosure. For instance, the communication device 300 can include a reset button (not shown). The reset button can be used to reset the controller 306 of the communication device 300. In yet another embodiment, the communication device 300 can also include a factory default setting button positioned, for example, below a small hole in a housing assembly of the communication device 300 to force the communication device 300 to re-establish factory settings. In this embodiment, a user can use a protruding object such as a pen or paper clip tip to reach into the hole and depress the default setting button. The communication device 300 can also include a slot for adding or removing an identity module such as a Subscriber Identity Module (SIM) card. SIM cards can be used for identifying subscriber services, executing programs, storing subscriber data, and so forth.

The communication device 300 as described herein can operate with more or less of the circuit components shown in FIG. 3. These variant embodiments can be used in one or more embodiments of the subject disclosure.

The communication device 300 can be adapted to perform the functions of the communication devices of FIG. 1. It will be appreciated that the communication device 300 can also represent other devices that can operate in communication system 100 of FIG. 1 such as a wireless gaming console or a wireless media player.

The communication device 300 (such as via baseband controller 303 and/or applications controller 306) can be adapted in various embodiments to perform the functions 315, including estimating channel gain and selectively performing one or both of digital and analog cancellation.

In one or more embodiments, management functions 315 (e.g., determining the application of analog and/or digital cancellation) can be performed by the baseband controller 303 and/or the applications controller 306 of device 300. In one embodiment, the baseband controller 303 can manage all of the long-distance radio functions, which may not include WiFi and/or Bluetooth communications. For example, the baseband processor 303 can utilize its own RAM and/or firmware. The baseband processor 303 due to the radio control functions (signal modulation, encoding, radio frequency shifting, etc.) can be highly timing dependent, and can utilize a real time operating system. In one embodiment, the baseband processor 303 can operate using an operating system that is distinct from an operating system of the applications processor 306. Device 300 can include various other components that may or may not be illustrated in FIG. 3, including power amplifiers, antennas, memory, user interfaces, SIM card, clock oscillator, battery and so forth. The components of device 300 can be arranged in various configurations, including positioning the baseband processor 303 between the applications processor 306 and the transceiver 302.

Upon reviewing the aforementioned embodiments, it would be evident to an artisan with ordinary skill in the art that said embodiments can be modified, reduced, or enhanced without departing from the scope of the claims described below. For example, other factors can be reviewed to determine whether to apply analog cancellation in addition to or in place of the digital cancellation, such as measured operating parameters of the receiving node 110, type of communication, and so forth.

In one or more embodiments, the cancellation technique can include forming an estimate of the channel gain from each interferer to the receiver in the time-domain, and convolving with the transmitted data in time domain to form an estimate of the interference signal. This estimated interference signal can be subtracted from the incoming signal at the receiver. This subtraction can be done either before or after the ADC, or in other words, in analog or in digital domain. In addition, the cancellation can be a mixture of digital and analog cancellation.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 4:
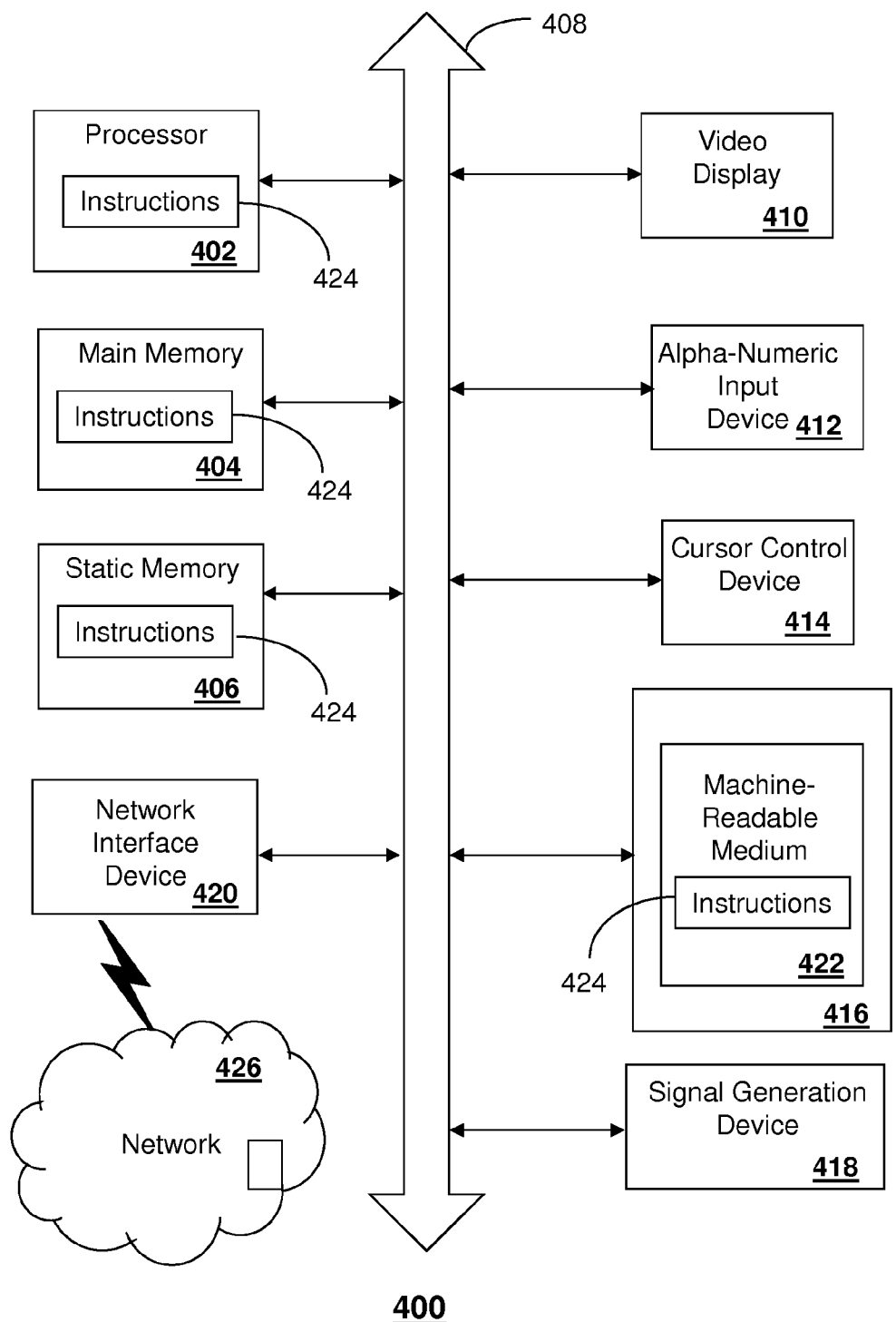
FIG. 4 is a diagrammatic representation of a machine in the form of a computer system within which a set of instructions, when executed, may cause the machine to perform any one or more of the methods described herein.

FIG. 4 depicts an exemplary diagrammatic representation of a machine in the form of a computer system 400 within which a set of instructions, when executed, may cause the machine to perform any one or more of the methods described above. For example, system 400 can enable end user devices to selectively perform analog and/or digital cancellation, such as in the time domain. One or more instances of the machine can operate, for example, as the nodes 110 and/or 160. In some embodiments, the machine may be connected (e.g., using a network 426) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 400 may include a processor (or controller) 402 (e.g., a central processing unit (CPU), a graphics processing unit (GPU, or both), a main memory 404 and a static memory 406, which communicate with each other via a bus 408. The computer system 400 may further include a display unit 410 (e.g., a liquid crystal display (LCD), a flat panel, or a solid state display. The computer system 400 may include an input device 412 (e.g., a keyboard), a cursor control device 414 (e.g., a mouse), a disk drive unit 416, a signal generation device 418 (e.g., a speaker or remote control) and a network interface device 420. In distributed environments, the embodiments described in the subject disclosure can be adapted to utilize multiple display units 410 controlled by two or more computer systems 400. In this configuration, presentations described by the subject disclosure may in part be shown in a first of the display units 410, while the remaining portion is presented in a second of the display units 410.

The disk drive unit 416 may include a tangible computer-readable storage medium 422 on which is stored one or more sets of instructions (e.g., software 424) embodying any one or more of the methods or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a system including a processor, a group of signals from a group of transmitters, wherein each of the group of signals includes training symbols according to an orthogonal frequency-division multiplexing protocol;
   determining, by the system, a channel gain for each of the group of signals;
   determining, by the system, a total interference based on the channel gain;
   determining, by the system, whether the total interference satisfies a threshold range of an analog-to-digital converter of the system;
   performing, by the system, digital time domain cancellation without performing analog time domain cancellation responsive to a determination that the total interference satisfies the threshold range; and
   performing, by the system, the analog time domain cancellation and the digital time domain cancellation responsive to a determination that the total interference does not satisfy the threshold range.

2. The method of claim 1, wherein the analog time domain cancellation is performed on target interference of the total interference that is associated with a subset of the group of transmitters, and further comprising determining, by the system, the subset of the group of transmitters based on a detection of whether a transmitter of the group of transmitters is a remote node.

3. The method of claim 2, wherein the detection of whether the transmitter is the remote node is based on provisioning information that is accessible to the system and that identifies the group of transmitters.

4. The method of claim 1, wherein the analog time domain cancellation is performed on target interference associated with a subset of the group of transmitters and further comprising determining, by the system, the subset of the group of transmitters based on a detection of whether a receive power level associated with each transmitter of the group of transmitters is below a receive power threshold.

5. The method of claim 4, wherein the receive power threshold corresponds to the threshold range of the analog-to-digital converter of the system.

6. The method of claim 1, wherein the channel gain is determined in a time domain.

7. The method of claim 1, wherein the group of signals includes a first set of training symbols for the digital time domain cancellation and a second set of training symbols for the analog time domain cancellation.

8. The method of claim 7, wherein a frequency of the system receiving the second set of training symbols for the analog time domain cancellation is greater than a frequency of the system receiving the first set of training symbols for the digital time domain cancellation.

9. The method of claim 1, wherein the receiving of the group of signals is responsive to a request for training symbols associated with a fault detection in a network over which the group of transmitters operate.

10. The method of claim 1, wherein the receiving of the group of signals by the system is according to a periodic broadcast.

11. The method of claim 1, wherein a portion of the interference is self-interference generated from transmitting and receiving at a same time in a same frequency.

12. The method of claim 1, wherein a portion of the interference is self-interference generated by a plurality of transmit antennas of the system.

13. The method of claim 1, wherein the analog time domain cancellation utilizes balun cancellation.

14. A device, comprising:
   a non-transitory memory that stores instructions;
   an analog-to-digital converter; and
   a processor coupled with the memory and the analog-to-digital converter, wherein responsive to executing the instructions, the processor performs operations comprising:
      determining channel gains for a group of transmitters based on training symbols associated with the group of transmitters; and
      selectively performing analog time domain cancellation and digital time domain cancellation responsive to a determination that a total interference does not satisfy a threshold range of the analog-to-digital converter, wherein the total interference is determined based on the channel gains.

15. The device of claim 14, wherein the operations further comprise:
  receiving the training symbols via wireless signals from the group of transmitters; and
  performing the digital time domain cancellation without performing the analog time domain cancellation responsive to a determination that the total interference satisfies the threshold range of the analog-to-digital converter.

16. The device of claim 14, wherein the analog time domain cancellation is performed on target interference of the total interference that is associated with a subset of the group of transmitters, and wherein the operations further comprise determining the subset of the group of transmitters based on a detection of whether a receive power level associated with each transmitter of the group of transmitters is below a receive power threshold.

17. The device of claim 16, wherein the receive power threshold corresponds to the threshold range of the analog-to-digital converter.

18. The device of claim 14, wherein the analog time domain cancellation is performed on target interference associated with a subset of the group of transmitters, and wherein the operations further comprise determining the subset of the group of transmitters based on a detection of whether a transmitter of the group of transmitters is a remote node, wherein the detection of whether the transmitter is the remote node is based on provisioning information that is accessible to the processor and that identifies the group of transmitters.

19. A non-transitory computer-readable storage device comprising computer instructions, which, responsive to being executed by a processor, cause the processor to perform operations comprising:
  determining channel gains for a group of transmitters based on transmitted training symbols; and
  performing analog time domain cancellation and digital time domain cancellation responsive to a determination that a total interference does not satisfy a threshold range of an analog-to-digital converter,
  wherein the total interference is determined based on the channel gains.

20. The non-transitory computer-readable storage device of claim 19, wherein the analog time domain cancellation is performed on target interference of the total interference that is associated with a subset of the group of transmitters, and wherein the operations further comprise determining the subset of the group of transmitters based on a detection of whether a receive power level associated with each transmitter of the group of transmitters is below a receive power threshold.

* * * * *